(12) United States Patent
Du et al.

(10) Patent No.: US 8,571,223 B2
(45) Date of Patent: Oct. 29, 2013

(54) METHOD FOR COMBINING AUTHENTICATION AND SECRET KEYS MANAGEMENT MECHANISM IN A SENSOR NETWORK

(75) Inventors: Zhiqiang Du, Shaanxi (CN); Jun Cao, Shaanxi (CN); Manxia Tie, Shaanxi (CN); Li Ge, Shaanxi (CN); Zhenhai Huang, Shaanxi (CN)

(73) Assignee: China Iwncomm Co., Ltd., Xi'an (CN)

( * ) Notice: Subject to any disclaimer, the term of this patent is extended or adjusted under 35 U.S.C. 154(b) by 10 days.

(21) Appl. No.: 13/382,651

(22) PCT Filed: Dec. 29, 2009

(86) PCT No.: PCT/CN2009/076173
§ 371 (c)(1),
(2), (4) Date: Jan. 6, 2012

(87) PCT Pub. No.: WO2011/006341
PCT Pub. Date: Jan. 20, 2011

(65) Prior Publication Data
US 2012/0114124 A1  May 10, 2012

(30) Foreign Application Priority Data
Jul. 15, 2009  (CN) .......................... 2009 1 0023382

(51) Int. Cl.
*H04L 9/08* (2006.01)
(52) U.S. Cl.
USPC ............. 380/278; 380/270; 380/44; 713/169; 713/171
(58) Field of Classification Search
None
See application file for complete search history.

(56) References Cited

U.S. PATENT DOCUMENTS

| 7,392,037 | B2 | 6/2008 | Qi et al. |
| 7,486,795 | B2* | 2/2009 | Eschenauer et al. .......... 380/277 |
| 7,999,685 | B2 | 8/2011 | Sanchez et al. |
| 2010/0293370 | A1 | 11/2010 | Xiao et al. |

FOREIGN PATENT DOCUMENTS

| CN | 1996833 A | 7/2007 |
| CN | 101005459 A | 7/2007 |
| CN | 101184010 A | 5/2008 |
| CN | 101232378 A | 7/2008 |
| CN | 101243673 A | 8/2008 |
| CN | 101282213 A | 10/2008 |
| JP | 2008543245 A | 11/2008 |
| WO | WO-2006131849 A2 | 12/2006 |

OTHER PUBLICATIONS

Zhu et al., LEAP: Efficient Security Mechanisms for Large-Scale Distributed Sensor Networks, ACM, 2003.*

(Continued)

*Primary Examiner* — Minh Dinh
(74) *Attorney, Agent, or Firm* — Harness, Dickey & Pierce, P.L.C.

(57) ABSTRACT

A method for combining authentication and secret keys management mechanism in a sensor network includes the following steps: 1) pre-distribution of the secret key, which includes 1.1) the pre-distribution of the communication secret key and 1.2) the pre-distribution of the initial broadcast message authentication secret key; 2) authentication, which includes 2.1) the authentication of the node identity and 2.2) the authentication of the broadcast message; and 3) negotiation of the session secret key by the nodes.

11 Claims, 1 Drawing Sheet

(56) References Cited

OTHER PUBLICATIONS

Eschenauer et al., A Key Management Scheme for Distributed Sensor Networks, ACM, 2002.*

Xiao et al., A Survey of key Management Schemes in Wireless Sensor Networks, 2007.*

Qian, Xuesong, "The Key Management Scheme in Wireless Sensor Networks," University of Science and Technology of China—A dissertation for master's degree, May 2009.

Li Yao et al., Efficient authentication and key agreement scheme for wireless sensor network. Computer Engineering and Applications. 2009 No. 19, pp. 107-109, Jul. 10, 2009.

International Search Report (in Chinese with English translation) and Written Opinion (in Chinese) for PCT/CN2009/076173, mailed Apr. 22, 2010; ISA/CN.

Seyit A. Camtepe and Bulent Yener. "Key Distribution Mechanisms for Wireless Sensor Networks: a Survey." Department of Computer Science, Rensselaer Polytechnic Institute. TR-05-07. Mar. 23, 2005.

* cited by examiner

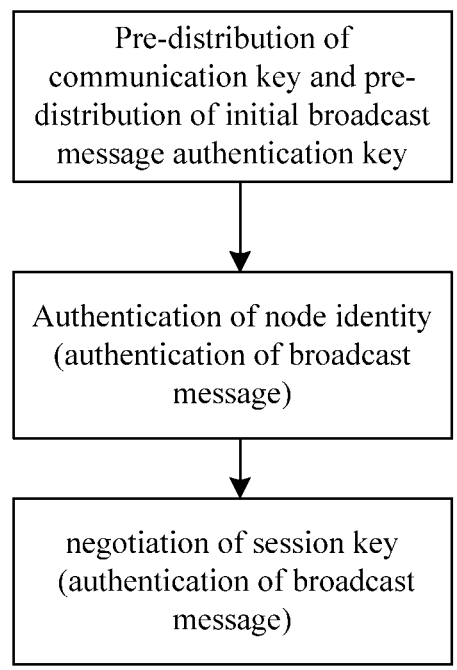

METHOD FOR COMBINING AUTHENTICATION AND SECRET KEYS MANAGEMENT MECHANISM IN A SENSOR NETWORK

CROSS-REFERENCE TO RELATED APPLICATIONS

This application is a 371 U.S. National Stage of International Application No. PCT/CN2009/076173, filed Dec. 29, 2009, which claims priority to Chinese Patent Application No. CN 200910023382.9, filed Jul. 15, 2009. The disclosures of the above applications are incorporated fully herein by reference.

FIELD OF THE INVENTION

The present invention relates to method for combining mechanisms of authentication and key management in sensor network.

BACKGROUND OF THE INVENTION

A sensor network is composed of a great number of sensor nodes which are small, cheap, powered by a battery, and capable of wireless communicating and monitoring. These nodes are deployed densely in the monitored region, so as to monitor the physical environment. Wireless sensor network is a new research subject in the information technology, and has promising prospect in applications such as environmental monitoring, military affairs, territory security, traffic control, community security protection, forest fire prevention, and target location.

Because most sensor nodes are deployed in unattended region or opponent region, the security issue of the sensor network is especially acute. The sensor network is a data-centered data collecting platform, and establishing a safe infrastructure of authentication and key management in the sensor network is the basis for safe convergence, storage and access control of data. Presently, research on security technologies in the sensor network has got great breakthrough, and many security technologies for the sensor network have been proposed. The key management, as the basis of the sensor network security and the supporting technology for implementing secret communication of nodes and identity authentication between nodes, generally includes two stages: pre-distribution of key before the network deployment; and establishment of key and negotiation of session key after the network deployment. The authentication includes message authentication and identity authentication. The sensor network implements important functions, such as the routing list creation, network searching, software updating, time synchronization, and network management, based on broadcast. Because of the wireless and broadcast characteristics of the sensor network, the broadcast information may be tampered or be inserted with malicious information by attackers. In view of this, it is necessary to introduce the authentication mechanism for ensuring the legitimacy and the integrity of the broadcast information, and the broadcast information authentication technology is also the basis of the sensor network security. The identity authentication, as the basis of the computer network security and also the basis of the sensor network security, is used to authenticate the legitimacy and the validity of the identities of the two communication parties. As the core security mechanism, the key management and the authentication are indispensable for sensor network security solutions and are mutually supporting. Specifically, the authentication mechanism needs the key pre-distribution technology in the key management mechanism to provide pre-shared keys or initial keys, and the session key negotiation technology in the key management mechanism bases in turn on the result of the identity authentication, so that a basic sensor network security solution is able to be constructed only if the authentication mechanism and the key management mechanism work in coordination. However, the combining of the key management mechanism and the authentication mechanism is not fully considered in designing a sensor network at present, thus it is failed to provide complete secret communication service and authentication service for the sensor network, and there is still potential safety hazard in the sensor network.

SUMMARY OF THE INVENTION

To solve the problems in the prior art described in the background portion of the present invention, a method for combining mechanisms of authentication and key management in a sensor network is proposed in the present invention by integrating sensor network key management, identity authentication, broadcast message authentication and other security mechanisms in the protocol management procedure, for providing a basic frame for the sensor network security.

The technical solution of the present invention is that the present invention provides a method for combining mechanisms of authentication and key management in a sensor network. The method includes the following steps:

1) Pre-distributing keys, including:

1.1) pre-distributing a communication key, which includes:

prior to network deployment, pre-distributing the communication key to nodes for establishing secure connection between the nodes; and 1.2) pre-distributing an initial broadcast message authentication key, which includes:

prior to network deployment, pre-distributing the initial key for authenticating a broadcast message to receiving nodes of the broadcast message;

2) performing authentication, including:

2.1) authenticating a node identity, which includes:

after network deployment, authenticating, by a communication node, legitimacy of a counterpart identity prior to communication; and 2.2) authenticating the broadcast message, which includes:

after network deployment, if there is broadcast in the network, authenticating, by the receiving nodes of the broadcast message, legitimacy of the broadcast message; and 3) negotiating a session key between the nodes, including:

after successfully authenticating the node identity, negotiating the session key between the nodes based on a result of the step of authenticating the node identity.

The step 1.1) includes:

1.1.1) prior to network deployment, generating a key pool in accordance with a scale of the network; and 1.1.2) pre-distributing a communication key for each of the nodes in response to the amount of the nodes and desired network connectivity in the network.

According to a basic method of random key pre-distribution, the step 1.1) includes: prior to sensor network deployment, generating the key pool with P keys in total and generating a key identification for each of the keys in the key pool, by a deployment server; and constructing a key chain for each of the nodes by randomly selecting k different keys from the key pool, in response to the amount of the nodes, the desired network connectivity in the network and the amount of neighbor nodes desired for the node, and loading the key chain into the node, by a deployment server, where k<<P.

The step 1.2) includes:

1.2.1) prior to network deployment, generating a broadcast message authentication key chain by a deployment server according to the scale of the network and characteristics of a broadcasting node; and 1.2.2) distributing the initial key of the broadcast message authentication key chain to all of the receiving nodes of the broadcast message, by the deployment server.

According to a μTESLA broadcast message authentication method, the step 1.2) includes: prior to network deployment, generating a one-way Hash chain, i.e. the broadcast message authentication key chain, for authenticating the broadcast message, by the deployment server according to a lifetime of the broadcasting node, a disclosure delay of the broadcast message authentication key and other parameters; distributing the broadcast message authentication key chain to the broadcasting node, and distributing a chain head key in the key chain to all of the receiving nodes of the broadcast message, by the deployment server.

The step 2.1) includes: after network deployment and prior to a node communication, performing pre-shared-key based authentication between the nodes based on a shared key, after establishment of the shared key between the nodes, or performing identity authentication between the nodes in another predetermined authentication manner.

The pre-shared-key based authentication includes:

a) generating a random number $N_A$ and sending the random number $N_A$ to a node B, by a node A;

b) generating a random number $N_B$, calculating a session key with the node A $SK=F(PSK, N_B\|N_A)$, generating a message authentication code $MAC_1=H(SK, N_B\|N_A)$ by using the session key SK, constructing a message $N_B\|N_A\|MAC_1$ and sending the massage $N_B\|N_A\|MAC_1$ to the node A, by the node B; and c) checking, by the node A whether the random number $N_B$ in the message matches up with the random number sent to the node B; if the random number $N_B$ in the message does not match up with the random number sent to the node B, ending the authentication; and if the random number $N_B$ in the message matches up with the random number sent to the node B, calculating a session key with the node B $SK=F(PSK, N_B\|N_A)$ and generating an authentication code $MAC_2=H(SK, N_B\|N_A)$ by using the $SK=F(PSK, N_B\|N_A)$, by the node A, and when $MAC_2=MAC_1$, calculating $MAC_3=H(SK, N_B)$ and constructing a message $N_B\|MAC_3$ and sending the massage $N_B\|MAC_3$ to the node B, by the node A;

where PSK represents the pre-shared key, F represents a key generating algorithm, and H represents the one-way Hash function.

The step 2.2) includes: if there is broadcast in the network, authenticating, by the receiving nodes of the broadcast message, legitimacy of the broadcast message based on the pre-distributed initial broadcast message authentication key.

According to a μTESLA broadcast message authentication method, the step 2.2) includes: performing MAC calculation on a message to be broadcasted by using a key $K_i$ in the broadcast message authentication key chain, and sending both the broadcast message and the MAC value to the receiving nodes of the broadcast message, by the broadcasting node; sending $K_i$ to the receiving nodes of the broadcast message by the broadcasting node after a predetermined disclosure delay of broadcast message authentication key; authenticating validity of $K_i$ based on the pre-distributed initial broadcast message authentication key, and authenticating legitimacy of the MAC value of the broadcast message based on $K_i$, thus authenticating legitimacy of the broadcast message, by the receiving nodes of the broadcast message.

The step 3) includes:

3.1) if point-to-point communication is required between the nodes, performing a unicast session key negotiation between the nodes based on the result of the authentication; and 3.2) if one-to-many communication is required between the nodes, performing a multicast session key negotiation between the nodes based on the result of the authentication and the unicast session key negotiation.

The negotiation in the step 3) includes:

a) generating a multicast session key MSK by a multicasting node;

b) encrypting the multicast session key MSK with a unicast session key generated between receiving nodes of a multicast message and the multicasting node, and sending the encrypted multicast session key MSK to the receiving nodes of the multicast message; storing the multicast session key MSK and responding to the multicasting node, by the receiving nodes of the multicast message.

In the step 3), if there is broadcast in the network, the receiving nodes of the broadcast message authenticates legitimacy of the broadcast message.

Each of the above mentioned nodes may be a base station, a cluster head node or a common node in the sensor network.

A system for combining mechanisms of authentication and key management in a sensor network, includes: a deployment server and nodes, the nodes including broadcasting nodes, receiving nodes of a broadcast message, receiving nodes of a multicast message, and multicasting nodes, where the deployment server pre-distributes a communication key and an initial broadcast message authentication key to the nodes; the nodes perform authentication and negotiation of a session key; the broadcasting node sends the broadcast message to the receiving nodes of the broadcast message; the receiving nodes of the broadcast message receive and process the broadcast message from the broadcasting node; the multicasting node sends a multicast message to the receiving nodes of the multicast message; and the receiving nodes of the multicast message receive and process the multicast message from the multicasting node.

Advantages of the present invention is that a method for combining mechanisms of authentication and key management in a sensor network is provided, for constructing a sensor network security infrastructure by integrating basic security technologies for the sensor network such as key management, identity authentication, and broadcast message authentication in the protocol management procedure. According to the present invention, firstly, the key pre-distribution in the sensor network key management technology and the initial broadcast massage authentication key pre-distribution in the broadcast message authentication technology are integrated; by pre-distributing the communication key and the initial broadcast message authentication key to the network node, prior to the network deployment, supports are provided for the identity authentication, the secret communication and the broadcast message authentication after the network deployment. Secondly, the broadcast message authentication is combined with the identity authentication and the negotiation of the session key, so that the authentication of the broadcast message is able to be performed while the identity authentication and the negotiation of the session key are performed. By means of the above integration of the basic security technologies for the sensor network, the present invention constructs a security system structure of the sensor network, forming a basic security solution for the sensor network.

BRIEF DESCRIPTION OF THE DRAWINGS

FIG. 1 is a schematic flow chart of a method for combining mechanisms of authentication and key management in a sensor network provided by the present invention.

DETAILED DESCRIPTION OF THE INVENTION

Referring to FIG. 1, the present invention provides a method for combining mechanisms of authentication and key management in a sensor network, and the method includes the following steps.

1) Pre-distributing keys, including mainly the following two sub-steps:

1.1) pre-distributing a communication key, i.e., prior to network deployment, pre-distributing the communication key to nodes for establishing secure connection between the nodes, which includes:

1.1.1) prior to network deployment, generating a key pool in accordance with a scale of the network; and 1.1.2) pre-distributing a communication key for each of the nodes in response to the amount of the nodes and desired network connectivity in the network.

According to a basic method of random key pre-distribution, prior to sensor network deployment, a deployment server generates the key pool with P keys in total and generates a key identification for each of the keys in the key pool; and then the deployment server constructs a key chain for each of the nodes by randomly selecting k different keys from the key pool, in response to the amount of the nodes, the desired network connectivity in the network and the amount of neighbor nodes desired for the node, and loads the key chain into the node, where k<<P. This random pre-distribution manner enables adjacent nodes to share the key in a certain probability, so as to establish a security connection, ensuring desired network connectivity after the network deployment.

1.2) pre-distributing an initial broadcast message authentication key, i.e., prior to network deployment, pre-distributing the initial key for authenticating a broadcast message to receiving nodes of the broadcast message, which includes:

1.2.1) prior to network deployment, the deployment server generating a broadcast message authentication key chain according to the scale of the network and characteristics of a broadcasting node; and 1.2.2) the deployment server distributing the initial key of the broadcast message authentication key chain to all of the receiving nodes of the broadcast message.

According to a µTESLA broadcast message authentication method, prior to network deployment, the deployment server generates a one-way Hash chain, i.e. the broadcast message authentication key chain, for authenticating the broadcast message, according to a lifetime of the broadcasting node and a disclosure delay of the broadcast message authentication key and other parameters; then the deployment server distributes the broadcast message authentication key chain to the broadcasting node, and distributes a chain head key in the key chain to all of the receiving nodes of the broadcast message, where the deployment server may send the broadcast message authentication key chain to the broadcasting node in an online manner.

2) performing authentication, including mainly the following two sub-steps:

2.1) authenticating a node identity, i.e., after network deployment, a communication node authenticating legitimacy of a counterpart identity prior to communication, which includes: after network deployment and prior to a node communication, performing pre-shared-key based authentication between the nodes based on a shared key, after establishment of the shared key between the nodes, or performing identity authentication between the nodes in another predetermined authentication manner.

The pre-shared-key based authentication by using a shared key PSK includes: a) a node A generating a random number $N_A$ and sending the random number $N_A$ to a node B; b) the node B generating a random number $N_B$, calculating a session key with the node A $SK=F(PSK, N_B\|N_A)$, generating a message authentication code $MAC_1=H(SK, N_B\|N_A)$ by using the session key SK, constructing a message $N_B\|N_A\|MAC_1$ and sending the massage $N_B\|N_A\|MAC_1$ to the node A; and c) the node A checking whether the random number $N_B$ in the message matches up with the random number sent to the node B by the node A in step a); if the random number $N_B$ in the message does not match up with the random number sent to the node B, ending the authentication; and if the random number $N_B$ in the message matches up with the random number sent to the node B, calculating a session key with the node B $SK=F(PSK, N_B\|N_A)$ and generating an authentication code $MAC_2=H(SK, N_B\|N_A)$ by using the $SK=F(PSK, N_B\|N_A)$; when $MAC_2=MAC_1$, the node A calculating $MAC_3=H(SK, N_B)$, constructing a message $N_B\|MAC_3$ and sending the massage $N_B\|MAC_3$ to the node B; where PSK represents the pre-shared key, F represents a key generating algorithm, and H represents the one-way Hash function.

2.2) performing authentication on a broadcast message, i.e., after network deployment, if there is broadcast in the network, the receiving nodes of the broadcast message authenticating legitimacy of the broadcast message, which includes: if there is broadcast in the network, the receiving nodes of the broadcast message authenticating legitimacy of the broadcast message. Depending on the situation of the broadcast in the network, the authentication of the broadcast message may be performed at any time after the network deployment, for example during the negotiation of the session key.

According to a µTESLA broadcast message authentication method, the broadcasting node firstly performs MAC calculation on a message to be broadcasted by using a certain key $K_i$ in the broadcast message authentication key chain, and sends both the broadcast message and the MAC value to the receiving nodes of the broadcast message; the broadcasting node sends $K_i$ to the receiving nodes of the broadcast message after a predetermined disclosure delay of the broadcast message authentication key; the receiving nodes of the broadcast message authenticate validity of $K_i$ based on the pre-distributed initial broadcast message authentication key, and then authenticates legitimacy of the MAC value of the broadcast message based on $K_i$, thus authenticates legitimacy of the broadcast message.

3) negotiating a session key between the nodes, i.e., after successfully authenticating the node identity, negotiating the session key between the nodes based on a result of the step of authenticating the node identity. In this procedure, when there is broadcast in the network, the receiving nodes of the broadcast message authenticate the validity of the broadcast message, which includes:

3.1) if point-to-point communication is required between the nodes, performing a unicast session key negotiation between the nodes based on the result of the authentication; and 3.2) if one-to-many communication is required between the nodes, performing a multicast session key negotiation between the nodes based on the result of the authentication and the unicast session key negotiation.

The negotiation may include: a) a multicasting node generating a multicast session key MSK; b) encrypting the multicast session key MSK with a unicast session key generated between receiving nodes of a multicast message and the multicasting node, and sending the encrypted multicast session key MSK to the receiving nodes of the multicast message; the receiving nodes of the multicast message storing the multicast session key MSK and responding to the multicasting node.

The node mentioned in the present invention refers to various network entities in the sensor network, including but not limited to a base station, a cluster head node or a common node.

A system for combining mechanisms of authentication and key management in a sensor network, includes a deployment server and nodes. The nodes include a broadcasting node, receiving nodes of a broadcast message, receiving nodes of a multicast message, and a multicasting node. The deployment server pre-distributes a communication key and an initial broadcast message authentication key to the nodes; the nodes perform authentication and negotiation of a session key; the broadcasting node sends a broadcast message to the receiving nodes of the broadcast message; the receiving nodes of the broadcast message receive and process the broadcast message from the broadcasting node; the multicasting node sends a multicast message to the receiving nodes of the multicast message; and the receiving nodes of the multicast message receive and process the multicast message from the multicasting node.

What is claimed is:

1. A method for combining mechanisms of authentication and key management in a sensor network, comprising:
   1) Pre-distributing keys, comprising:
   1.1) pre-distributing communication keys, which comprises:
   prior to network deployment, pre-distributing the communication keys to nodes for establishing secure connection between the nodes; and
   1.2) pre-distributing an initial broadcast message authentication key, which comprises:
   prior to network deployment, pre-distributing the initial key for authenticating a broadcast message to receiving nodes of the broadcast message;
   2) performing authentication, comprising:
   2.1) authenticating a node identity, which comprises:
   after network deployment, authenticating, by a communication node, legitimacy of a counterpart identity prior to communication, comprising after network deployment and prior to a node communication, performing pre-shared-key based authentication between the nodes based on a shared key, after establishment of the shared key between the nodes, wherein performing pre-shared-key based authentication comprises:
   a) generating a random number $N_A$ and sending the random number $N_A$ to a node B, by a node A;
   b) generating a random number $N_B$, calculating a session key with the node A SK=F(PSK, $N_B\|N_A$), generating a message authentication code $MAC_1$=H(SK, $N_B\|N_A$) by using the session key SK, constructing a message $N_B\|N_A\|MAC_1$ and sending the massage $N_B\|N_A\|MAC_1$ to the node A, by the node B; and
   c) checking, by the node A whether the random number $N_B$ in the message matches up with the random number sent to the node B; if the random number $N_B$ in the message does not match up with the random number sent to the node B, ending the authentication; and if the random number $N_B$ in the message matches up with the random number sent to the node B, calculating a session key with the node B SK=F(PSK, $N_B\|N_A$) and generating an authentication code $MAC_2$=H(SK, $N_B\|N_A$) by using the session key SK=F(PSK, $N_B\|N_A$), by the node A, and when $MAC_2$=$MAC_1$, calculating $MAC_3$=H(SK, $N_B$) and constructing a message $N_B\|MAC_3$ and sending the massage $N_B\|MAC_3$ to the node B, by the node A;
   wherein PSK represents the pre-shared key, F represents a key generating algorithm, and H represents a one-way Hash function; and
   2.2) authenticating the broadcast message, which comprises:
   after network deployment, if there is broadcast in the network, authenticating, by the receiving nodes of the broadcast message, legitimacy of the broadcast message; and
   3) negotiating a session key between the nodes, comprising:
   after successfully authenticating the node identity, negotiating the session key between the nodes based on a result of the step of authenticating the node identity.

2. The method for combining mechanisms of authentication and key management in a sensor network according to claim 1, wherein the step 1.1) comprises:
   1.1.1) prior to network deployment, generating a key pool in accordance with a scale of the network; and
   1.1.2) pre-distributing a communication key for each of the nodes in response to an amount of the nodes and desired network connectivity in the network.

3. The method for combining mechanisms of authentication and key management in a sensor network according to claim 2, wherein when utilizing a basic method of random key pre-distribution, the step 1.1.1) comprises: prior to sensor network deployment, generating the key pool with P keys in total and generating a key identification for each of the keys in the key pool, by a deployment server; and
   the step 1.1.2) comprises: constructing a key chain for each of the nodes by randomly selecting k different keys from the key pool, in response to the amount of the nodes, the desired network connectivity in the network and an amount of neighbor nodes desired for the node, and loading the key chain into the node, by a deployment server, where k<<P.

4. The method for combining mechanisms of authentication and key management in a sensor network according to claim 1, wherein the step 1.2) comprises:
   1.2.1) prior to network deployment, generating a broadcast message authentication key chain by a deployment server according to a scale of the network and characteristics of a broadcasting node; and
   1.2.2) distributing the initial key of the broadcast message authentication key chain to all of the receiving nodes of the broadcast message, by the deployment server.

5. The method for combining mechanisms of authentication and key management in a sensor network according to claim 4, wherein when utilizing a μTESLA broadcast message authentication method, the step 1.2.1) comprises: prior to network deployment, generating a one-way Hash chain, namely the broadcast message authentication key chain, for authenticating the broadcast message, by the deployment server according to a lifetime of the broadcasting node, a disclosure delay of the broadcast message authentication key and other parameters; and the step 1.2.2) comprises: distributing the broadcast message authentication key chain to the broadcasting node, and distributing a chain head key in the key chain to all of the receiving nodes of the broadcast message, by the deployment server.

6. The method for combining mechanisms of authentication and key management in a sensor network according to claim 1, wherein the step 2.2) comprises: if there is broadcast in the network, authenticating, by the receiving nodes of the broadcast message, a legitimacy of the broadcast message based on a pre-distributed initial broadcast message authentication key.

7. The method for combining mechanisms of authentication and key management in a sensor network according to claim 6, wherein when utilizing a μTESLA broadcast message authentication method, authenticating by the receiving nodes of the legitimacy of the broadcast message based on the pre-distributed initial broadcast message authentication key comprises: performing a MAC value calculation on a message to be broadcasted by using a key $K_i$ in the broadcast message authentication key chain, and sending both the broadcast message and the calculated MAC value to the receiving nodes of the broadcast message, by the broadcasting node; sending $K_i$ to the receiving nodes of the broadcast message by the broadcasting node after a predetermined disclosure delay of broadcast message authentication key; and authenticating validity of $K_i$ based on the pre-distributed initial broadcast message authentication key, and authenticating legitimacy of the calculated MAC value of the broadcast message based on $K_i$, thus authenticating legitimacy of the broadcast message, by the receiving nodes of the broadcast message.

8. The method for combining mechanisms of authentication and key management in a sensor network according to claim 1, wherein the step 3) comprises:

3.1) if point-to-point communication is required between the nodes, performing a unicast session key negotiation between the nodes based on the result of the authentication; and 3.2) if one-to-many communication is required between the nodes, performing a multicast session key negotiation between the nodes based on the result of the authentication and the unicast session key negotiation.

9. The method for combining mechanisms of authentication and key management in a sensor network according to claim 8, wherein performing a multicast session key negotiation in the step 3.2) comprises:

a) generating a multicast session key MSK by a multicasting node; and b) encrypting the multicast session key MSK with a unicast session key generated between receiving nodes of a multicast message and the multicasting node, and sending the encrypted multicast session key MSK to the receiving nodes of the multicast message; and storing the multicast session key MSK and responding to the multicasting node, by the receiving nodes of the multicast message.

10. The method for combining mechanisms of authentication and key management in a sensor network according to claim 1, wherein each of the nodes is a base station, a cluster head node or a common node in the sensor network.

11. A system for combining mechanisms of authentication and key management in a sensor network, comprising a deployment server and nodes, the nodes comprising a broadcasting node, receiving nodes of a broadcast message, receiving nodes of a multicast message, and a multicasting node, wherein the deployment server pre-distributes a communication key and an initial broadcast message authentication key to the nodes; the nodes perform authentication and negotiation of a session key; the broadcasting node sends the broadcast message to the receiving nodes of the broadcast message; the receiving nodes of the broadcast message receive and process the broadcast message from the broadcasting node; the multicasting node sends the multicast message to the receiving nodes of the multicast message; and the receiving nodes of the multicast message receive and process the multicast message from the multicasting node, wherein the nodes performing authentication and negotiation of a session key are configured for: after network deployment and prior to a node communication, performing pre-shared-key based authentication between the nodes based on a shared key, after establishment of the shared key between the nodes, wherein performing pre-shared-key based authentication comprises:

a) generating a random number $N_A$ and sending the random number $N_A$ to a node B, by a node A;

b) generating a random number $N_B$, calculating a session key with the node A SK=F(PSK, $N_B\|N_A$), generating a message authentication code $MAC_1$=H(SK, $N_B\|N_A$) by using the session key SK, constructing a message $N_B\|N_A\|MAC_1$ and sending the massage $N_B\|N_A\|MAC_1$ to the node A, by the node B; and c) checking, by the node A whether the random number $N_B$ in the message matches up with the random number sent to the node B; if the random number $N_B$ in the message does not match up with the random number sent to the node B, ending the authentication; and if the random number $N_B$ in the message matches up with the random number sent to the node B, calculating a session key with the node B SK=F(PSK, $N_B\|N_A$) and generating an authentication code $MAC_2$=H(SK, $N_B\|N_A$) by using the SK=F(PSK, $N_B\|N_A$), by the node A, and when $MAC_2$=$MAC_1$, calculating $MAC_3$=H(SK, $N_B$) and constructing a message $N_B\|MAC_3$ and sending the massage $N_B\|MAC_3$ to the node B, by the node A, wherein PSK represents the pre-shared key, F represents a key generating algorithm, and H represents a one-way Hash function.

* * * * *